US008934777B2

(12) United States Patent
Chang et al.

(10) Patent No.: US 8,934,777 B2
(45) Date of Patent: Jan. 13, 2015

(54) METHOD AND APPARATUS FOR INTERFERENCE SUPPRESSION IN RADIO-OVER-FIBER COMMUNICATION SYSTEMS

(71) Applicant: Industrial Technology Research Institute, Hsinchu (TW)

(72) Inventors: Hsien-Wen Chang, Hsinchu (TW); Ming-Chien Tseng, Zhubei (TW); Ming-Hung Cheng, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 155 days.

(21) Appl. No.: 13/762,767

(22) Filed: Feb. 8, 2013

(65) Prior Publication Data

US 2014/0140705 A1 May 22, 2014

(30) Foreign Application Priority Data

Nov. 22, 2012 (TW) .............................. 101143696 A

(51) Int. Cl.
*H04B 10/00* (2013.01)
*H04B 10/2575* (2013.01)
(52) U.S. Cl.
CPC ............................... *H04B 10/25753* (2013.01)
USPC ........... 398/115; 398/116; 398/159; 455/522; 455/517; 375/222
(58) Field of Classification Search
CPC .................................................. H04B 10/25752
USPC ............ 398/115, 116, 159; 455/522; 375/222
See application file for complete search history.

(56) References Cited

U.S. PATENT DOCUMENTS

| | | | |
|---|---|---|---|
| 6,807,374 B1 * | 10/2004 | Imajo et al. | ................... 398/115 |
| 6,985,531 B2 | 1/2006 | McCarty, Jr. | |
| 7,006,465 B2 | 2/2006 | Toshimitsu et al. | |

(Continued)

FOREIGN PATENT DOCUMENTS

| | | |
|---|---|---|
| AU | 2002357521 A1 | 7/2003 |
| CN | 1611019 A | 4/2005 |

(Continued)

OTHER PUBLICATIONS

Chang et al., "Field trial results for integrated WiMAX and radio-over-fiber systems on high speed rail", 22nd IEEE Personal Indoor Mobile Radio Communications, p. 1945-p. 1949, 2011.

(Continued)

*Primary Examiner* — Danny Leung
(74) *Attorney, Agent, or Firm* — Rabin & Berdo, P.C.

(57) ABSTRACT

According to one embodiment of a method for interference suppression in radio-over-fiber communication systems, the method uses a mode selection module to continuously update real time information of at least two mobile stations and determine to enter a cross mode or a single mode. In the single mode, when a mobile station approaches a switching point, a single mode command is issued to control at least one first specific remote antenna unit (RAU). In the cross mode, when an immediate cross condition is a new cross condition, a new cross mode table is generated, and when the position of any one mobile station of the at least two mobile stations cross a threshold, a cross mode command is issued to control at least one second specific RAU according to a corresponding cross mode table.

22 Claims, 17 Drawing Sheets

(56) References Cited

U.S. PATENT DOCUMENTS

| | | | |
|---|---|---|---|
| 7,173,990 B2 | 2/2007 | Kim et al. | |
| 7,633,994 B2 | 12/2009 | Forenza et al. | |
| 7,636,381 B2 | 12/2009 | Forenza et al. | |
| 8,224,184 B2 | 7/2012 | Xu et al. | |
| 8,588,614 B2* | 11/2013 | Larsen | 398/115 |
| 2003/0016622 A1 | 1/2003 | McCarty | |
| 2003/0123582 A1 | 7/2003 | Kim et al. | |
| 2003/0228151 A1* | 12/2003 | Niiho et al. | 398/115 |
| 2004/0247278 A1* | 12/2004 | Hirano et al. | 385/147 |
| 2006/0009168 A1 | 1/2006 | Khan et al. | |
| 2007/0093273 A1 | 4/2007 | Cai | |
| 2008/0056167 A1* | 3/2008 | Kim et al. | 370/294 |
| 2008/0080631 A1 | 4/2008 | Forenza et al. | |
| 2008/0118004 A1 | 5/2008 | Forenza et al. | |
| 2008/0219670 A1* | 9/2008 | Kim et al. | 398/115 |
| 2009/0186658 A1 | 7/2009 | Jiang et al. | |
| 2010/0046361 A1 | 2/2010 | Jeong et al. | |
| 2010/0172309 A1 | 7/2010 | Forenza et al. | |
| 2010/0226653 A1* | 9/2010 | Yeh et al. | 398/115 |
| 2011/0164878 A1 | 7/2011 | Ma et al. | |
| 2011/0201368 A1 | 8/2011 | Faccin et al. | |
| 2011/0223964 A1* | 9/2011 | Ebiko | 455/522 |
| 2012/0134279 A1 | 5/2012 | Tamaki | |
| 2012/0135743 A1* | 5/2012 | Ebiko et al. | 455/452.2 |
| 2013/0122830 A1 | 5/2013 | Wang et al. | |
| 2014/0140705 A1* | 5/2014 | Chang et al. | 398/116 |

FOREIGN PATENT DOCUMENTS

| | | |
|---|---|---|
| CN | 1941955 A | 4/2007 |
| CN | 101166068 A | 4/2008 |
| CN | 103107849 A | 5/2013 |
| CN | 103580734 A | 2/2014 |
| EP | 0702462 A1 | 3/1996 |
| EP | 0869625 A1 | 10/1998 |
| EP | 0869630 A2 | 10/1998 |
| EP | 1175022 A2 | 1/2002 |
| EP | 1211630 A2 | 6/2002 |
| EP | 1361673 A1 | 11/2003 |
| EP | 1467504 A1 | 10/2004 |
| EP | 1505531 A1 | 2/2005 |
| EP | 1622329 A1 | 2/2006 |
| EP | 1857960 A2 | 11/2007 |
| EP | 1895688 A1 | 3/2008 |
| EP | 2256947 A1 | 12/2010 |
| EP | 2278764 A2 | 1/2011 |
| JP | 2003198445 A | 7/2003 |
| KR | 20080020402 A | 3/2008 |
| KR | 100819257 B1 | 4/2008 |
| TW | 201006292 A | 2/2010 |
| TW | 201023538 A | 6/2010 |
| TW | 201215011 A | 4/2012 |
| TW | 201320641 A | 5/2013 |
| TW | 201406117 A | 2/2014 |
| WO | WO-03058851 A1 | 7/2003 |

OTHER PUBLICATIONS

Feng et al., "MAC-layer performances of radio over fiber and basestation-based WiMax Pico-cell networks", 2010 15th OptoeElectronics and Communications Conference OECC), vol. 2 p. 720-p. 721, 2010.

Kim et al., "Radio-Over-Fiber System for TDD-Based OFDMA Wireless Communication Systems", Journal of Lightwave Technology, vol. 25, No. 11, p. 3419-p. 3427, 2007.

Gomes et al., "Analysis of performance degradation in Radio-over-Fiber systems based on IEEE 802.16 protocol", 2009 IEEE Latin-American Conference on Communications, p. 1-p. 6 , 2009.

Mitsuyama et al., "Development of MMSE Macro-Diversity Receiver with Delay Difference Correction Technique", 2011 IEEE Globecom, p. 1-p. 5, 2011.

Sklikas et al., "MAC layer performance evaluation of IEEE 802.16e Radio-over-Fiber networks", 2010 IEEE International Topical Meeting on Microwave Photonics, p. 350-p. 353, 2010.

Taiwan Patent Office, Office Action, Patent Application No. TW101143696, Oct. 23, 2014, Taiwan.

\* cited by examiner

| Mileage | RAU | Control Scheme of Transmission Power |
|---|---|---|
| ... | | |
| $m_n$ | n+1 | $-2T\Delta_\gamma$ dB |
| $m_n + d_{n,s}$ | n+1 | 0 dB |
| ... | | |
| $m_k$ | k | 0 dB |
| $m_k + d_{k,s}$ | k | $-2T\Delta_\gamma$ dB |
| ... | | |

FIG. 9

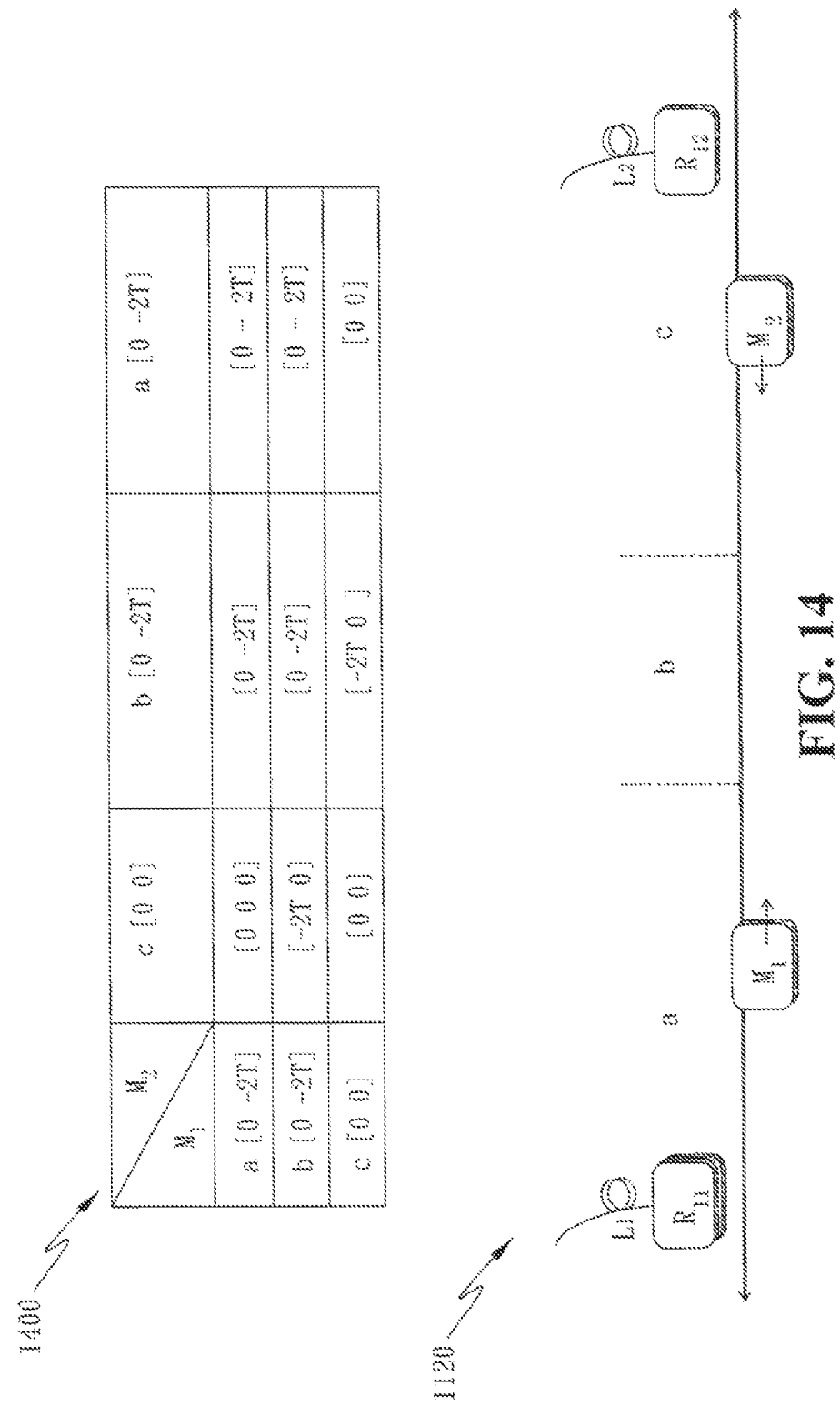

METHOD AND APPARATUS FOR INTERFERENCE SUPPRESSION IN RADIO-OVER-FIBER COMMUNICATION SYSTEMS

CROSS-REFERENCE TO RELATED APPLICATION

The present application is based on, and claims priority from, Taiwan Patent Application No. 101143696, filed Nov. 22, 2012, the disclosure of which is hereby incorporated by reference herein in its entirety.

BACKGROUND

1. Technical Field

The present disclosure relates generally to a method and apparatus for interference suppression in radio-over-fiber (RoF) communication systems.

2. Related Art

The radio-over-fiber (RoF) technology is one of the important technologies in high-speed communication systems. In a RoF system, a base station (BS) is located in a head end unit (HEU) to transmit and receive signals to/from a mobile station (MS) through a plurality of remote antenna units (RAU) geographically distributed. These RAUs connect the base station via optical fibers with unequal lengths. In the orthogonal frequency division multiplexing (OFDM) communication system having a fixed moving trajectory (such as railways), the RoF technology may extend the coverage of the base station for reducing implementation and maintenance cost and improving the mobile station signal quality. In the RoF system, the base station needs to control the plurality of RAUs at different positions. When the mobile station moves among these RAUs, the delay spread caused by different lengths of optical fibers may exceed the processing range of the mobile station transceiver, thus a decline of the signal quality may occur, or the delay spread of signal may become too large and lead to disconnection of mobile stations.

There are several methods. For example, in one method a time delay module is designed in the baseband or the radio frequency (RF) end to perform estimation and compensation for the time difference. For example, in a RoF system 100 of FIG. 1, $L_1$ and $L_2$ represent the required fiber lengths that the base station 110 reaches the RAU1 and the RAU2, respectively; $\tau 1$ and $\tau 2$ represent signal propagation times of RAU1 with transmit power $\gamma_1$ and RAU2 with transmit power $\gamma_2$, respectively. The fiber of unequal lengths may produce additional delay(s). For example, in FIG. 1, D represents the distance between the RAU1 and the RAU2, the distance between the RAU1 and the mobile station 120 approximates d, and the distance between the RAU1 and the mobile station 120 approximates D–d. Thus an additional delay $\Delta\tau$ (i.e. $|\tau 2-\tau 1|$) is estimated to approximate $|L_1-L_2|/V_f$, where $V_f$ is the signal propagation speed in the optical fiber. In another method a time delay unit is used in the base station end to delay uplink/downlink signals, and a time delay module is used to measure and generate a time delay control signal, and then a time delay compensator is used to compensate the signal in the optical fiber according to time delay control signal, to maintain synchronization between the base station and transmit signals of the RAU. When the time delay module is designed at the baseband, this method may also change the design of the base station.

In another method, it is proposed to pad each optical fiber length between head end and each RAU to result in a same optical fiber length for reaching these RAUs. FIG. 2A shows curves illustrating the impact of the fiber length on the throughput, wherein a solid curve 212 represents the throughput with equal fiber length and a dotted curve 214 represents the throughput with unequal fiber length. FIG. 2B shows a schematic view illustrating the comparison of optical fiber length versus the carrier to interference and noise ratio (CINR), wherein a solid curve 224 represents the CINR with equal fiber length and a dashed curve 222 represents the CINR with unequal fiber length.

Yet in another method the length of the guard interval (GI) or the time gap in the OFDM system is adjusted. For example, some techniques provide the relationship of the GI length and the delay spread caused by unequal optical fiber lengths. In other words, the GI length is at least greater than three times of the maximum delay spread. To support a greater fiber length difference, the approach of increasing the GI length may be used, such as shown in FIG. 3, a part 310 of an original available spectrum is copied into a GI 320.

Among the existing RAU control technologies, some may need to change the base station design or are coupled with high complexity to introduce distortion; Some technologies of fiber equalization lead to high construction cost, or lacking flexibility of adjustment; Some GI adjustment technologies sacrifice the spectral efficiency, and spend more resources for transmitting duplicate signals. Therefore, it may need to design an interference suppression technology in the RoF communication systems to determine whether multipath mode may cause disconnection, and automatically adjust the RAU transmission power, with features including adjustability, simple structure, and unaffected spectrum efficiency.

SUMMARY

The exemplary embodiments of the present disclosure may provide a method and apparatus for interference suppression in radio-over-fiber (RoF) communication systems.

One exemplary embodiment relates to a method for interference suppression in radio-over-fiber communication systems. The method may comprise: updating a real time information of at least one mobile station and determining to enter a cross mode or a single mode by using a mode selection module; in the single mode, when a mobile station of the at least one mobile station approaching a switching point, issuing a single mode command to control at least one first specific remote antenna unit (RAU); and in the cross mode, when an immediate cross condition being a new cross condition, generating a new cross mode table, and when a position of any one mobile station of the at least one mobile station crossing a threshold, issuing a cross mode command to control at least one second specific RAU according to a corresponding cross mode table.

Another exemplary embodiment relates to an apparatus for interference suppression in radio-over-fiber (RoF) communication systems, and the apparatus is configured in a RoF switch controller. The apparatus may comprise a mode selection module, a cross mode module, and a single mode module. The mode selection module is configured to update a real time information of at least one mobile station and select a cross mode or a single mode. When the single mode is selected, the single mode module issues a single mode command to the RoF switch controller when a mobile station approaches a switching point, to control at least one first specific remote antenna unit (RAU). When the cross mode is selected, the cross mode module determines an immediate cross condition is a new cross condition, then generates a new cross mode table, and when a position of any one mobile station of the at least one mobile station crosses a threshold,

BRIEF DESCRIPTION OF THE DRAWINGS

FIG. 9 shows an exemplary LUT generated according to the operation flow in FIG. 8, according to an exemplary embodiment.

FIG. 14 shows a generated cross mode table under the scenario of the cross mode of $R_{1,1}$ equals to $R_{2,1}$, according to an exemplary embodiment.

DETAILED DESCRIPTION OF DISCLOSED EMBODIMENTS

Figure 1:
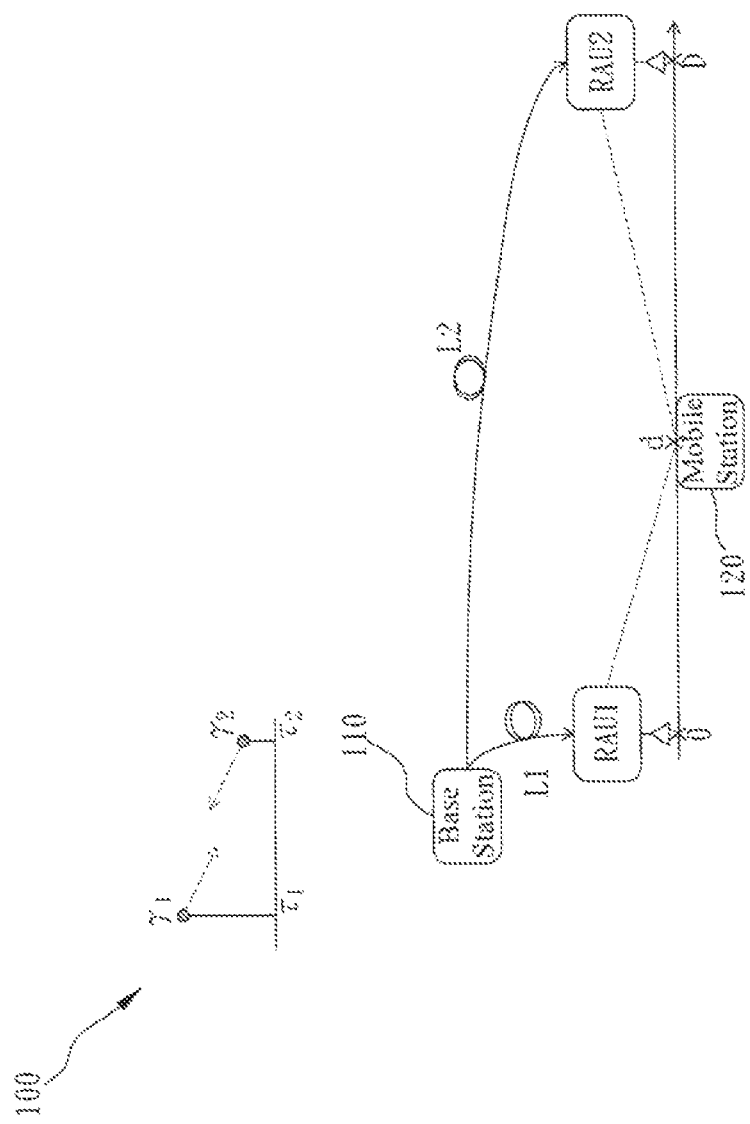
FIG. 1 shows a schematic view of a radio-over-fiber communication system model.
Figure 2A:
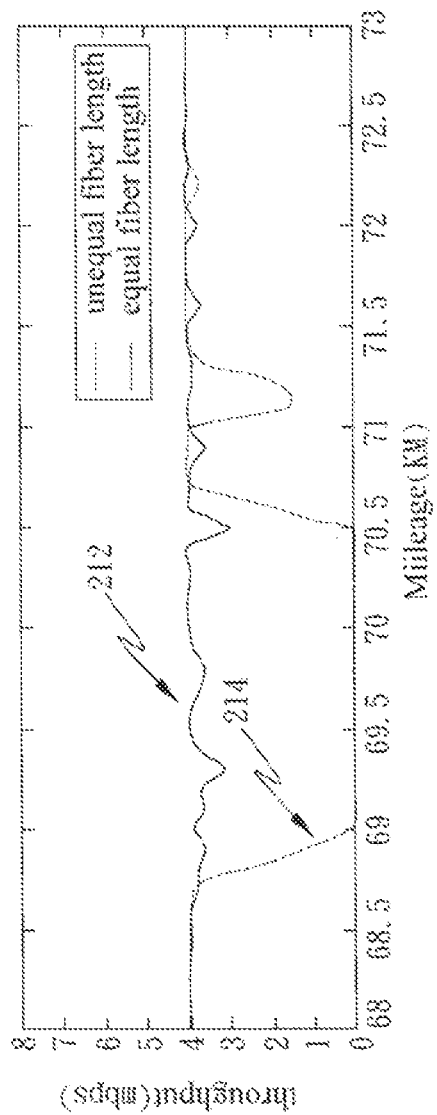
FIG. 2A shows a schematic view of curves of the optical fiber length versus the throughput.
Figure 2B:
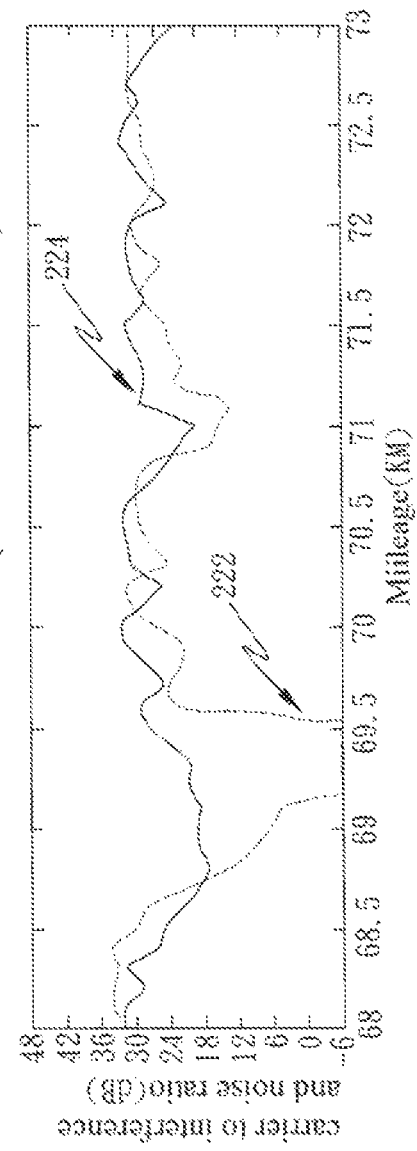
FIG. 2B shows a schematic view of curves of the comparison of the optical fiber length versus the carrier to interference and noise ratio.
Figure 3:
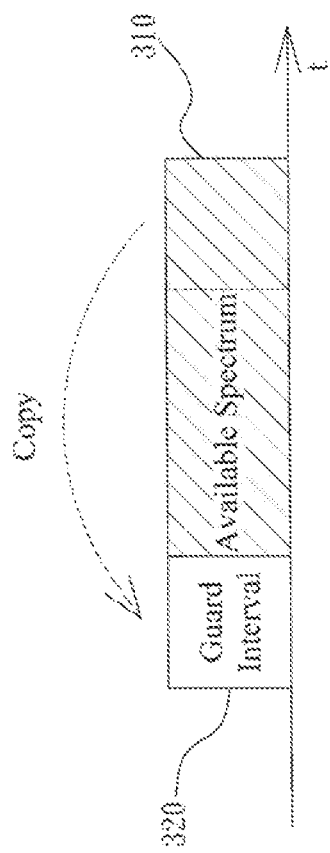
FIG. 3 shows a schematic view illustrating the adjustment for the length of the guard interval in an OFDM system.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The technique of interference suppression in a RoF communication system in the exemplary embodiments of the present disclosure firstly check the received signal quality degradation condition of mobile station caused by the signals from a plurality of remote antenna units (RAUs), then the RoF system determines whether the multipath mode may cause disconnection, and automatically adjusts the transmission power of the RAU, such that regardless in a single mode or a cross mode, the mobile station may avoid the multipath interference, and maintain sufficient received signal strength.

Figure 4:
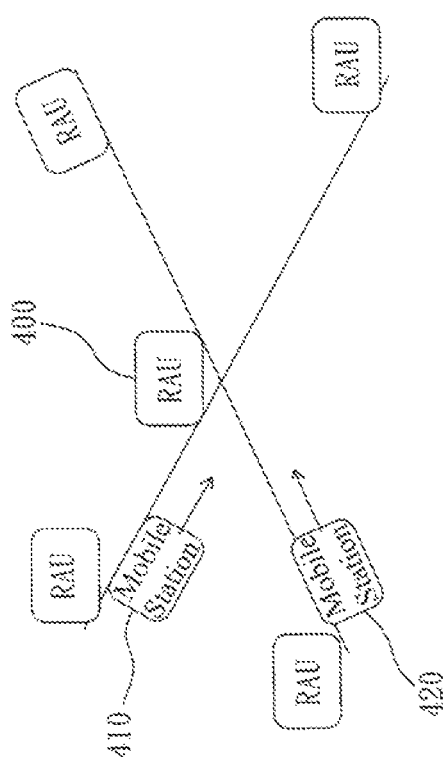
FIG. 4 shows a schematic view of a scenario of a cross mode, according to an exemplary embodiment.
Figure 5:
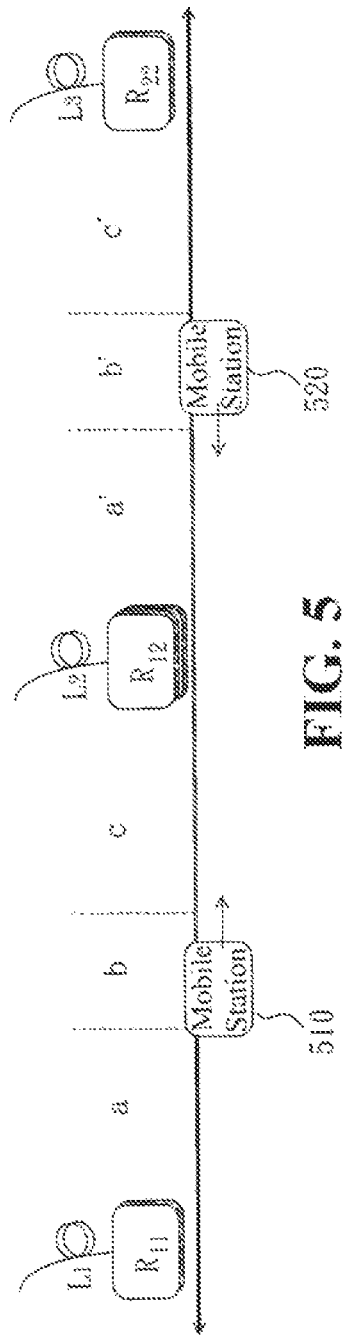
FIG. 5 shows a schematic view of another scenario of a cross mode, according to an exemplary embodiment.

In the present disclosure, the scenario for the single mode means there is only one mobile station in a neighborhood. There are two scenarios in the cross mode, such as shown in FIG. 4 and FIG. 5, respectively. In FIG. 4, the scenario of the cross mode is that only one RAU 400 overlapped of two mobile stations (mobile station 410 and mobile station 420) during the process of crossing each other. In FIG. 5, the scenario of the cross mode is that two mobile stations (denoted by a mobile station 510 and a mobile station 520) pass by each other in contrary directions, and one or two RAUs are overlapped during the process of crossing each other.

In the scenario of the cross mode of FIG. 5, the mobile station 510 may receive signals from two RAUs (denoted as $R_{11}$ and $R_{12}$), and the mobile station 520 may receive signals from two RAUs (denoted as $R_{21}$ and $R_{22}$). The area between two RAUs may be divided into three zones. The mobile station 510 may sequentially pass through the three zones between $R_{11}$ and $R_{12}$, i.e. the zone a, the zone b and the zone c. Similarly, the mobile station 520 may sequentially pass through the three zones between $R_{21}$ and $R_{22}$, i.e. the zone c', the zone b', the zone a', and these two mobile stations cross each other in the overlapped RAU (i.e. $R_{12}$ and $R_{21}$).

In a RoF or an OFDM system, when the RAU closer to the mobile station has a longer fiber length, the transmission delay of the RAU closer to the mobile station may be larger than the transmission delay of the RAU far from the mobile station. If the receiving end fails to detect the weaker path, and uses the longer path as the beginning of receiving signal, then there is likely to induce an inter-symbol interference (ISI), thus the system performance is reduced. When the mobile station receives signals from a plurality of RAUs, only when the relative power (denoted as $|\gamma_2-\gamma_1|$) having a specific relationship with the relative delay (denoted as $|\tau_2-\tau_1|$) it may cause system performance degradation. The specific relationship is determined according to system parameters. The system parameters such as modulation and coding rate, throughput, etc., wherein $\gamma_1$ and $\tau_1$ are respectively the transmission power and signal transmission delay time through the RAU1, $\gamma_2$ and $\tau_2$ are respectively transmission power and signal transmission delay time through the RAU2.

Figure 6:
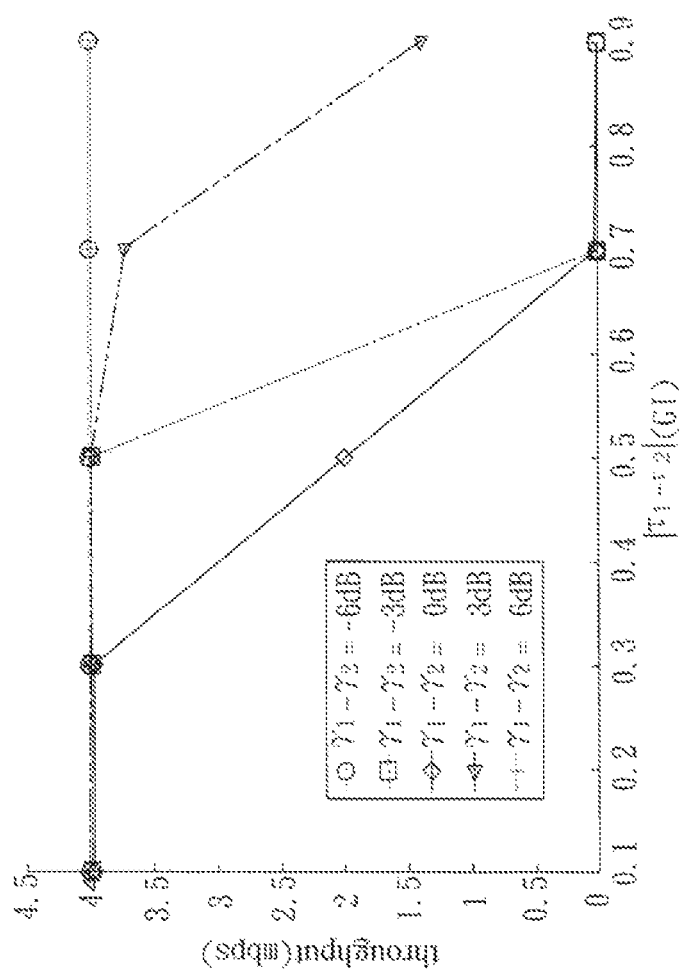
FIG. 6 shows an experimental result illustrating a relationship of relative transmission delay and throughput for some specific relative transmission powers, according to an exemplary embodiment.

FIG. 6 shows an experimental result illustrating a relationship of relative transmission delay $|\tau_2-\tau_1|$ and throughput for some specific relative transmission powers $|\gamma_2-\gamma_1|$, according to an exemplary embodiment. Wherein the relative transmission power $\gamma_1-\gamma_2$ of the two paths is from −6 dB to 6 dB, and the relative transmission delay $|\tau 2-\tau 1|$ is from 0.1 GI to 0.9 GI. According to the experimental result in FIG. 6, the throughput of the system may not be affected under the following condition:

for all relative transmission delays, $|\gamma_2-\gamma_1|\geq 6$ dB; or for all relative transmission powers, $|\tau 2-\tau 1|\leq 0.3$ GI.

Otherwise, the throughput may degrade or even drop to zero.

Therefore, an exemplary embodiment of the disclosure defines three critical thresholds, to determine whether a mobile station is able to maintain a stable connection and successfully decode the received signals. The definition and description of these three thresholds are as follows, wherein the mobile station is located between two RAUs (denoted as $R_n$ and $R_{n+1}$), $\gamma_n$ and $\gamma_{n+1}$ are respectively the received signal strengths from the $R_n$ and the $R_{n+1}$.

(a) When the received signal strength is below a critical threshold $T_\gamma$, the mobile station is unable to maintain the stable connection;

(b) When $|\gamma_n-\gamma_{n+1}|\geq$ a critical threshold $T_{\Delta\gamma}$, and when the received signal strength is higher than the $T_\gamma$, the mobile station is able to successfully decode the received signal;

(c) When $|\gamma_n-\gamma_{n+1}|\geq$ a critical threshold $T_{\Delta\gamma}$, and when the received signal strength is higher than the $T_\gamma$, the mobile station is able to successfully decode the received signal;

The actual values of these three critical thresholds $T_\gamma$, $T_{\Delta\gamma}$, and $T_{\Delta\tau}$ may refer to such as experimental measurement, and relate to the design of the mobile station, the modulation and coding scheme (MCS) such as the Quadrature Phase Shift Keying (QPSK) provided by the base station, etc.

According to these three critical thresholds, the exemplary embodiments of the present disclosure design a RAU transmission power switching method to adjust the RAU transmission power, in order to eliminate the delay spread caused by unequal length of optical fibers. The RAU transmission power switching method is used in the aforementioned single mode. In the single mode, when the mobile station closes to the switching point pre-planed in a lookup table (LUT), the mobile station transmits an operation instruction in this planed lookup table to control the specific RAU. For the aforementioned cross mode, the exemplary embodiments of the present disclosure design corresponding cross mode tables for different cross conditions to describe control schemes of multiple RAUs for each of the two mobile stations in different time intervals. And, when the position of any mobile station crosses a critical threshold, operation instructions are issued according to a corresponding cross mode table to control the specific RAU.

Accordingly, when in an on-line operation, the exemplary embodiments of the present disclosure may perform pre-planned operation instructions of RAUs with the look-up table, according to real time information of the mobile station, such as the position, the speed, and the relative distance (multiple mobile stations) of the mobile station, and switch between the single mode and the cross mode. The exemplary embodiments may continuously update the real time information of the mobile station, such as position (mileage), moving speed (including direction), and two RAUs mobile closer to the mobile station by using a mode selection module, and decide to enter a cross mode or a single mode.

Figure 7:
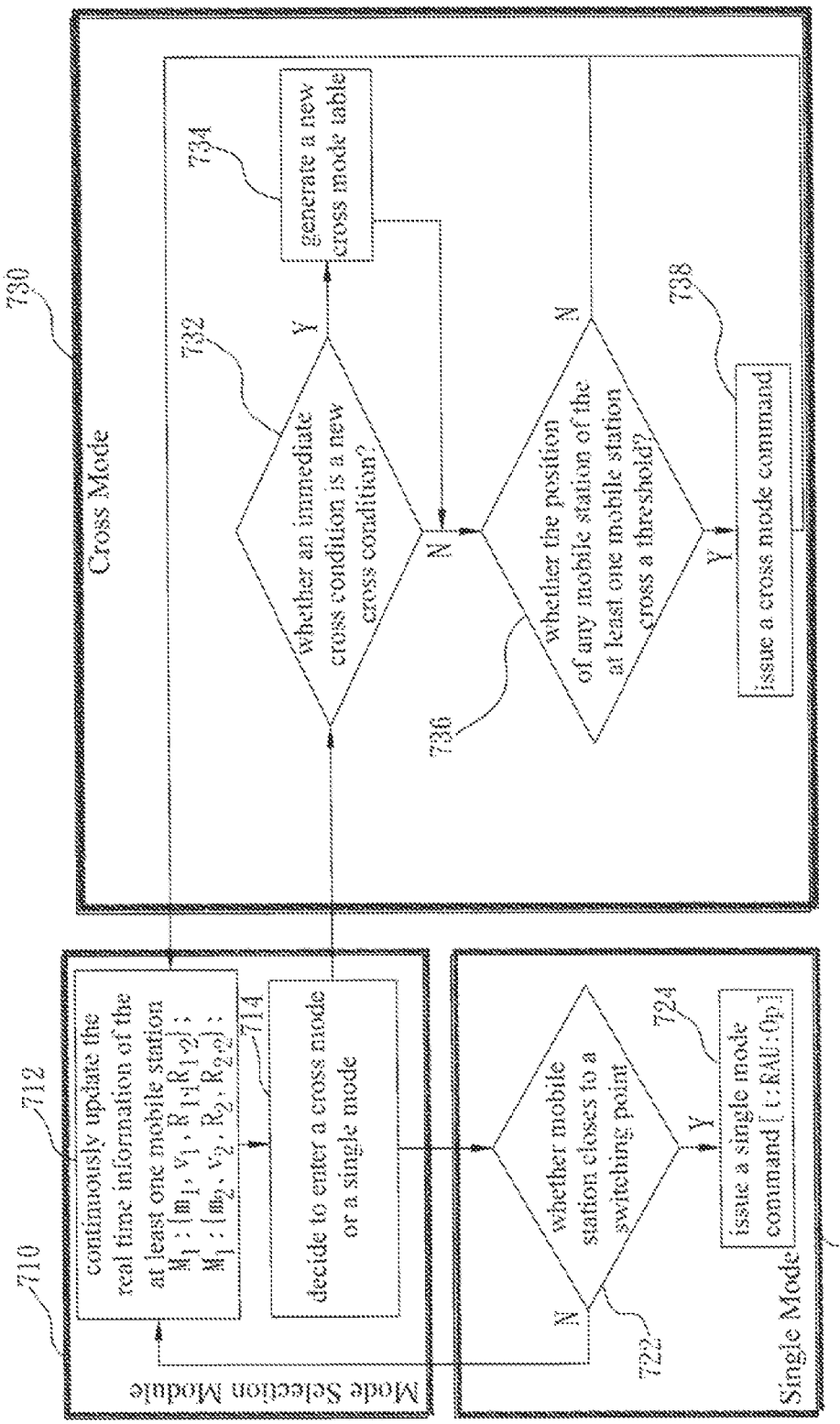
FIG. 7 shows a method for interference suppression in RoF communication systems, according to an exemplary embodiment.

Following the above, FIG. 7 shows a method for interference suppression in RoF communication systems, according to an exemplary embodiment. The RoF communication system has a plurality of RAUs. Refer to FIG. 7, the method may continuously update the real time information of at least two mobile stations by using a mode selection module 710 (step 712), such as the position (mileage), moving speed (including direction) of at least one mobile station, and two RAUs closer to each mobile station, and decide to enter a cross mode or a single mode (step 714). In the single mode 720, when one mobile station closes to a switching point (step 722, YES), the method issues a single mode command (step 724), to control at least one first specific RAU; Otherwise, the method returns to step 712, to continuously update the real time information of at least two mobile stations.

In the cross mode 730, the method may firstly determine whether an immediate cross condition is a new cross condition (step 732). When the current cross condition is a new cross condition (step 732, YES), the method generates a new cross mode table (step 734); and determine whether the position of any mobile station of the at least two mobile stations cross a threshold (step 736); When the immediate cross condition is not a new cross condition (step 732, NO), the method may perform step 736, to determine whether any mobile station of the at least two mobile stations cross a threshold (step 736, YES), this method issues a cross mode command (step 738) according to a corresponding cross mode table, to control at least one second specific RAU. When any mobile station of the at least two mobile stations does not cross a threshold (step 736, NO), the method goes back to step 712 to continuously update the real time information of the at least two mobile stations.

Figure 8:
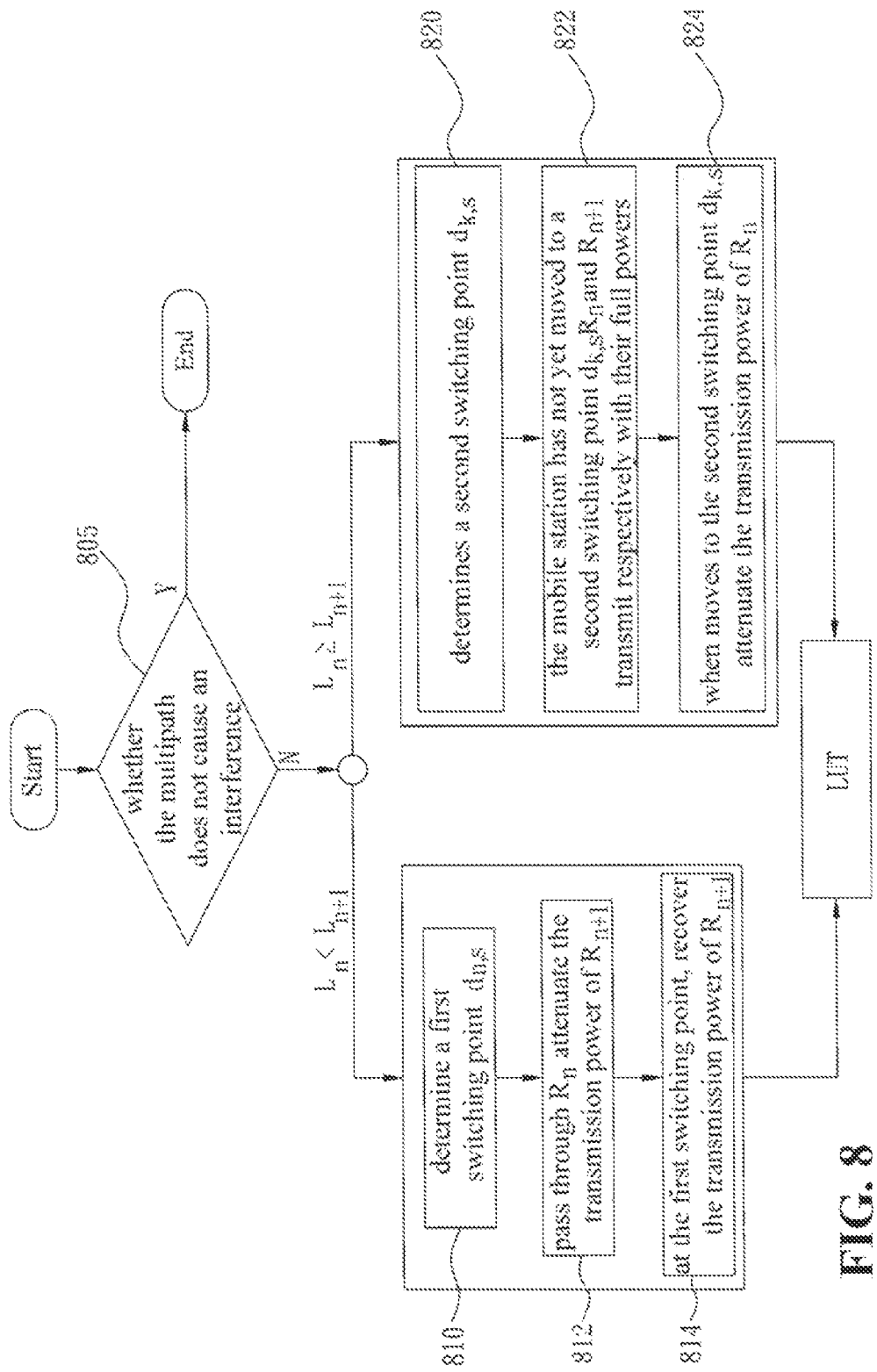
FIG. 8 shows a flowchart of generating a LUT, according to an exemplary embodiment.

In step 714, the mode selection module 710 determines whether these two mobile stations occur crossing according to the position information of each mobile station of the two mobile stations, such as mileage, estimated speed, and the two nearest RAUs to, to decide to enter a cross mode or a single mode. In the operation of the single mode 720, performing a single mode instruction is dependent on a pre-generated entry by a LUT, each entry of the LUT includes at least a mileage field, a RAU field, and a specific RAU transmission power control mode of the RAU field. Thus, when the mobile station closes to the switching point, it means that the mobile station moves to the mileage in the mileage field of a corresponding entry in the LUT, at this moment, the issued single mode instructions is performed according to the contents of the entry. In other words, the issued single mode command may control the transmission power of the specific RAU in the RAU field of the entry. FIG. 8 shows a flowchart of generating a LUT, according to an exemplary embodiment.

Refer to FIG. 8, for a mobile station between two RAUs (denoted as $R_n$ and $R_{n+1}$), the LUT generating method may determine whether multipath does not cause an interference (step 805). When the multipath does not cause the interference (step 805, YES), the process flow of generating the LUT is terminated. When the multipath does cause the interference (step 805, NO), the relationship of optical fiber lengths of these two RAUs (respectively referred to as $L_n$ and $L_{n+1}$) is divided into two conditions, and each condition has a corresponding checking. The first condition is $L_n<L_{n+1}$, the second condition is $L_n\geq L_{n+1}$. In the first condition ($L_n<L_{n+1}$), a first switching point $d_{n,s}$ is determined (step 810); in step 812, when the mobile station passes through the $R_n$ (i.e., the mileage of this mobile station is $m_n$), the transmission power of $R_{n+1}$ is attenuated by such as $2T_{\Delta\gamma}$dB (This control scheme is such as denoted as $-2T_{\Delta\gamma}$dB); until the mobile station is at the first switching point (i.e., the distance between the mobile station and the $R_n$ is $d_{n,s}$, the mileage of the mobile station is $m_n+d_{n,s}$), the $R_{n+1}$ transmission power is restored (this control scheme is such as denoted as 0 dB), as shown in step 814. As described above, the information of the mobile station mileage $m_n$, $R_{n+1}$, and control scheme of attenuating the transmission power of $R_{n+1}$ (for example $-2T\Delta\gamma$dB) in the step 812, and the information of the mobile station mileage $m_n$ plus first switching point $d_{n,s}$, $R_{n+1}$, and the transmission power of $R_{n+1}$ is recovered (this control scheme is such as denoted as 0 dB) in step 814 are respectively pre-filled into two entries of a LUT.

In the second condition ($L_n\geq L_{n+1}$), the LUT generating method determines a second switching point $d_{k,s}$ (step 820); in step 822, before the mobile station has not yet moved to the second switching point $d_{k,s}$, $R_n$ and $R_{n+1}$ transmit respectively with their full powers. When the mobile station moves to the second switching point $d_{k,s}$, the transmission power of $R_n$ is attenuated by such as $2T_{\Delta\gamma}dB$ (This control scheme is such as denoted as $-2T\Delta\gamma dB$), as shown in step 824. Similarly, as described above, the information of the mileage ($m_k$) of the mobile station, the $R_k$, and the $R_k$ transmit with full power in step 822, and the information of the mobile station's mileage ($m_k$+the second switching point), the $R_n$, and the transmission power of $R_n$ is attenuated in step 824 are also respectively pre-filled into other two entries of the LUT.

As following the above description in FIG. 8, FIG. 9 shows an exemplary LUT generated according to the operation flow in FIG. 8, according to an exemplary embodiment. Wherein each entry of the lookup table (LUT) 900 includes a mileage field, a RAU field, and a control scheme of the transmission power of a specific RAU in the RAU field. As shown in FIG. 9, the contents of each field of element 912 and element 914 are generated based on the first condition ($L_n<L_{n+1}$), and the contents of each field of an entry 922 and an entry 924 are generated according to the second condition ($L_n \geq L_{n+1}$).

In step 805 of the first condition ($L_n<L_{n+1}$) in FIG. 8, for the mobile station, let $d_{n,1}$ and $d_{n,2}$ represent respectively two distances from $R_n$, wherein $\Delta\gamma_n(d_{n,1})=T_{\Delta\gamma}$ and $\Delta\gamma n(d_{n,2})=-T_{\Delta\gamma}$. When the distance d from the $R_n$ to the mobile station is smaller than $d_{n,1}$ (i.e. $d<d_{n,1}$) or greater than or equal to $d_{n,2}$, $|\Delta\gamma_n(d)|$ is greater than $T_{\Delta\gamma}$ and the multipath may not cause the interference. When the distance d from the $R_n$ to the mobile station is between $d_{n,1}$ and $d_{n,2}$, it may use the following formula (1) and formula (2) to check whether $|\Delta\tau_n(d)| \leq T_{\Delta\tau}$, so that the multipath will not cause the interference:

$$\Delta T_{n,1} = \frac{L_n - L_{n+1}}{V_f} + \frac{2d_{n,1} - D}{V_a} \geq -T_{\Delta T} \qquad (1)$$

$$\Delta T_{n,2} = \frac{L_n - L_{n+1}}{V_f} + \frac{2d_{n,2} - D}{V_a} \leq -T_{\Delta T} \qquad (2)$$

wherein D is the distance between the $R_n$ and the $R_{n+1}$, $v_f$ and $v_a$ are the signal transmission speeds in the optical fiber and in the air, respectively.

In other words, when a mobile station knows the signal strength of different RAUs, and the signal strength difference of two RAUs exceeds the critical threshold $T_{\Delta\gamma}$, the weaker signal may be regarded as the interference without affecting the reception performance of the mobile station. When the mobile station knows the signal delay of different RAUs, and the signal delay difference of two RAUs is less than the critical threshold $T\Delta\tau$, no matter what the transmission power difference $\Delta\gamma$ between the two RAUs is, it may not affect the reception performance of the mobile station. The $T_{\Delta\gamma}$ and $T_{\Delta\tau}$ may be obtained by static experimental measurements. If the formula (1) and the formula (2) are satisfied, it does not have to control the transmission powers of RAU between the $R_n$ and the $R_{n+1}$. When $L_n=L_{n+1}$ and having an appropriate cell plan, usually the formula (1) and the formula (2) are automatically satisfied.

Figure 10A:
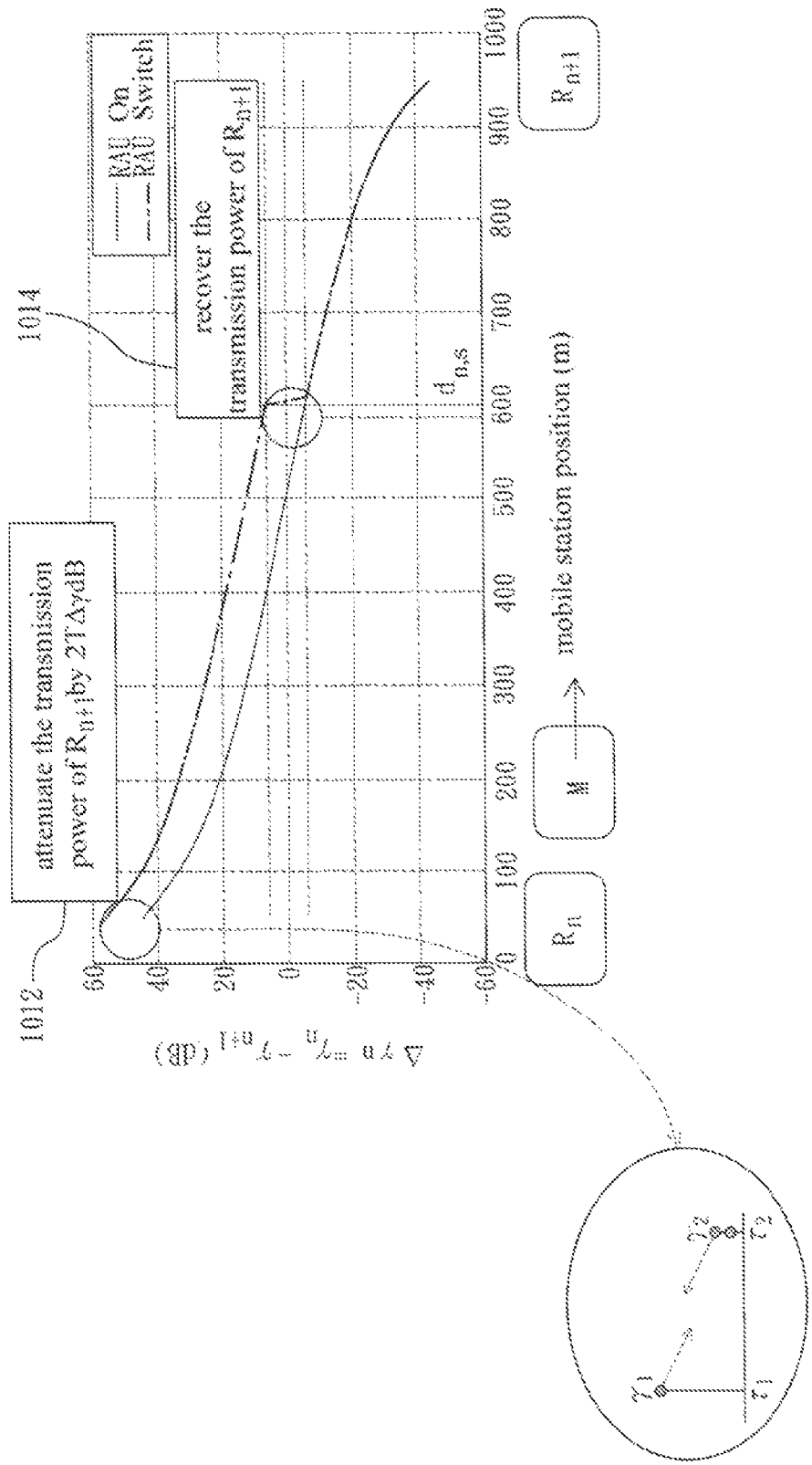
FIG. 10A and FIG. 10B show schematic views for the RAU control scheme of the first and the second scenarios in the single mode, respectively, according to another exemplary embodiment.
Figure 10B:
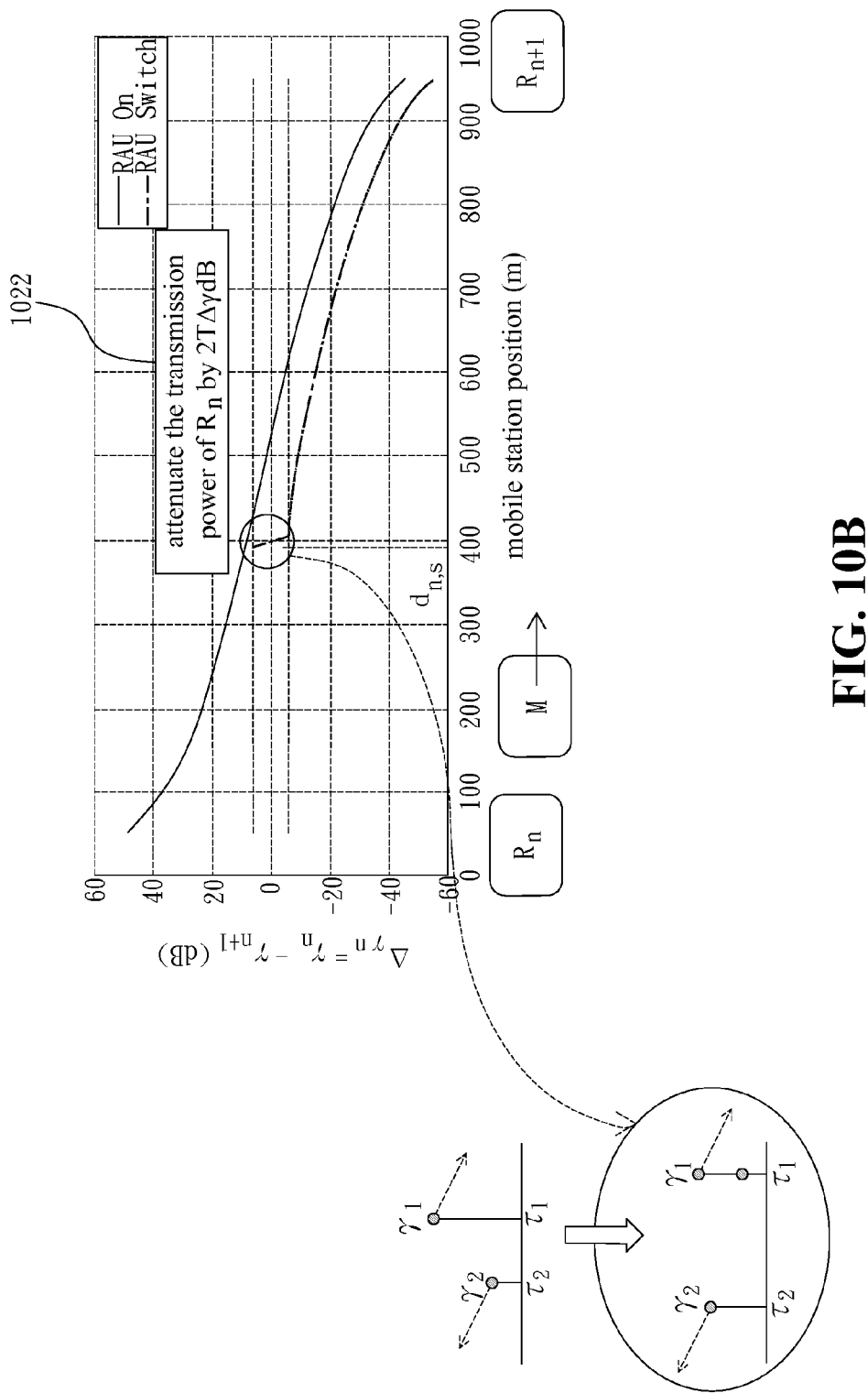

The first switching point $d_{n,s}$ of the above mentioned first condition may be determined by using the following function formula (3)

$$d_{n,s} = \min\{d_{n,3}, d_{n,4}, d_{n,5}\} \qquad (3)$$

wherein $\gamma_n(d_{n,3})=T_\gamma$, $\Delta\gamma_n(d_{n,4})=-T_{\Delta\gamma}$, and $\Delta\tau_n(d_{n,5})=-T_{\Delta\tau}$. In other words, the minimum function (min) is decided according to a threshold $T_\gamma$ of the received signal strength of $R_n$ by the mobile station, a negative threshold ($-T_{\Delta\gamma}$) of a relative transmission power of two RAUs, and a negative threshold ($-T_{\Delta\tau}$) of a relative signal transmission delay (relative delay) of the two RAUs. If $d_{n,s}=d_{n,3}$, then the $R_n$ needs additional attenuation to make $\Delta\gamma_n(d_{n,s})=-T_{\Delta\gamma}$. The transmission power control method of the first condition is such as shown in FIG. 10A, when a mobile station M passes through the $R_n$, the transmission power of $R_{n+1}$ is attenuated by $2T_{\Delta\gamma}dB$, as indicated by an arrow 1012; until when the mobile station in at the first switching point $d_{n,s}$, the transmission power of $R_{n+1}$ is recovered, as indicated by an arrow 1014. The second switching point $d_{n,s}$ of the second condition ($L_n \geq L_{n+1}$) may be determined by using the following function formula:

$$d_{n,s} = \max\{d_{n,3}, d_{n,4}, d_{n,5}\}$$

wherein $\gamma_{n+1}(d_{n,3})=T_\gamma$, $\Delta\gamma_n(d_{n,4})=T_{\Delta\gamma}$, and $\Delta\tau_n(d_{n,5})=T_{\Delta\tau}$. In other words, the above maximum function (max) may be determined according to a critical threshold ($T_\gamma$) of the signal strength of $R_{n+1}$ received by the mobile station, a positive threshold ($T_{\Delta\gamma}$) of a relative transmission power of two RAUs, and a positive critical threshold $T_{\Delta\tau}$ of a relative signal transmission delay of the two RAUs. The transmission power control scheme of the second condition is such as shown in FIG. 10B, when the mobile station passes through the $R_n$, both the $R_n$ and the $R_{n+1}$ transmit respectively with their full powers until the mobile station moves to a second switching point $d_{n,s}$, the transmission power of $R_n$ is attenuated such as by $2T_{\Delta\gamma}dB$, as indicated by an arrow 1022. In FIG. 10A and FIG. 10B, the horizontal axis represents the position of the mobile station, and the vertical axis represents $\Delta\gamma_n$ (i.e. $\gamma_n-\gamma_{n+1}$).

The above mentioned FIG. 8, FIG. 9, FIG. 10A, and FIG. 10B illustrate operations used in the single mode. When the system is the scenarios of FIG. 4 or FIG. 5, such as when two mobile stations gradually close to each other, the mode selection module 710 may switch to the cross mode according to the determined cross condition. Assume a mobile station may only receive in a same time at most signals from two RAUs, the first mobile station may receive signals from two RAUs (referred to as $R_{1,1}$ and $R_{1,2}$), and the second mobile station may receive signals from two RAUs (referred to as $R_{2,1}$ and $R_{2,2}$). According to the exemplary embodiments of the present disclosure, the condition for switching to the cross mode is $R_{1,i}$ equals to $R_{2,j}$ wherein i belongs to $\{1, 2\}$, and j belongs to $\{1, 2\}$. The condition $R_{1,i}$ equals to $R_{2,j}$ for switching to the cross mode corresponds to three cross modes respectively, such as a cross mode 1110 shown in FIG. 11A, a cross mode 1120 shown in FIG. 11B, and a cross mode 1130 shown in FIG. 11C, respectively. Wherein each of the two mobile stations $M_1$ and $M_2$ may be located in one of three zones, thus a total of nine possible combinations. In the cross mode 1110, for example, the mobile station $M_1$ is located in the zone b of the three zones of the zone a, the zone b, and the zone c; while the mobile station $M_2$ is located in the zone b' of the three zones of the zone a', the zone b', and the zone c'. These three cross mode may sequentially correspond to three phases. For each phase, the cross mode may generate a corresponding cross mode table.

Figure 11A:
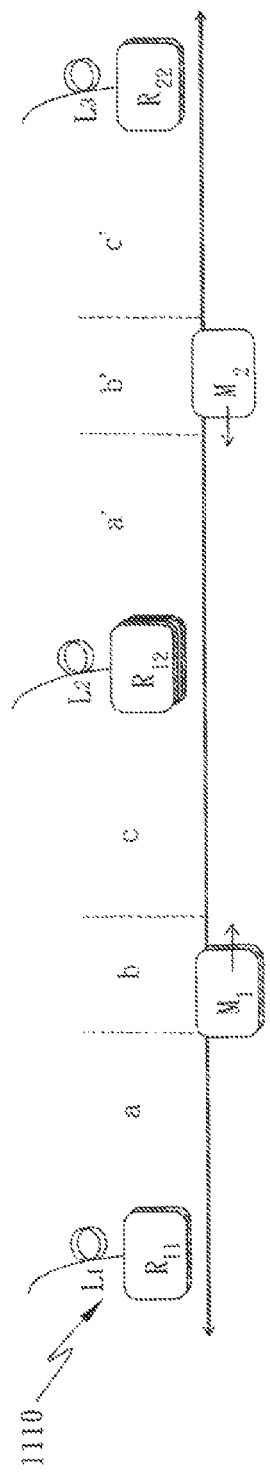
FIG. 11A, FIG. 11B and FIG. 11C show schematic views illustrating corresponding three cross modes for switching to the cross mode under the condition of $R_{1,i}$ equals to $R_{2,j}$, respectively, according to an exemplary embodiment.
Figure 11B:
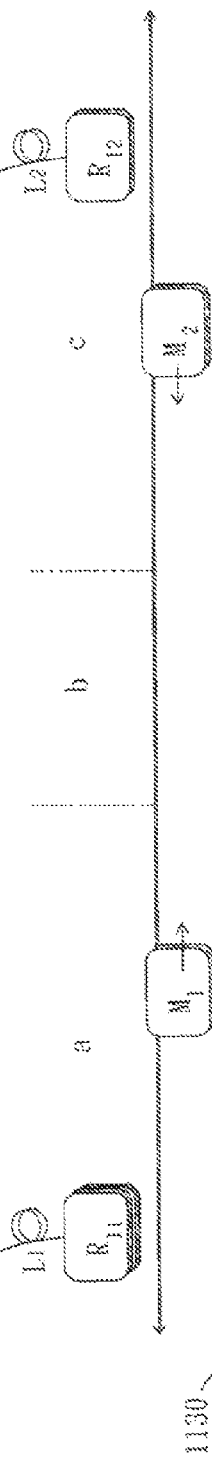
Figure 11C:
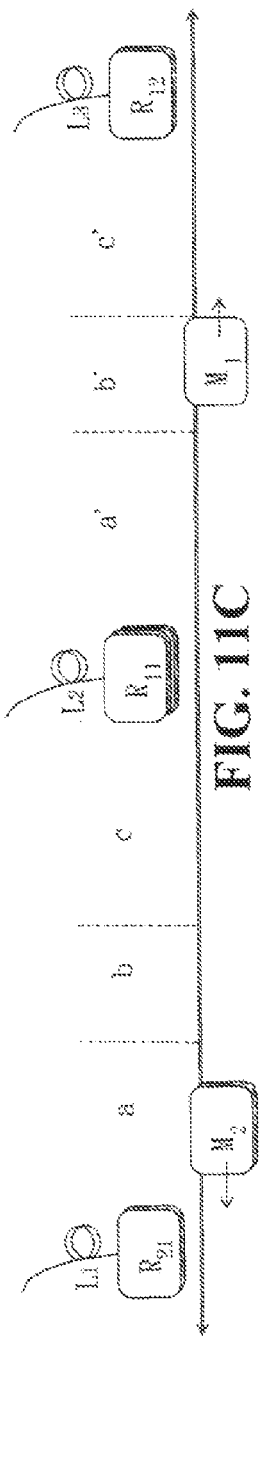

In FIG. 11a, the condition for switching to the cross mode 1110 is $R_{1,2}=R_{2,1}$, that is, $R_{1,2}$ and $R_{2,1}$ represent the same RAU. In FIG. 11B, the condition for switching to the cross mode 1120 is $R_{1,2}=R_{2,2}$, that is, $R_{1,2}$ and $R_{2,2}$ represent the same RAU. In FIG. 11C, the condition for switching to the cross mode 1130 is $R_{1,1}=R_{2,2}$, that is, $R_{1,1}$ and $R_{2,2}$ represent the same RAU. Similarly, the exemplary embodiments of the present disclosure may predetermine the relationship of each RAU control scheme and the mobile station position for each cross mode, according to given system parameters, such as the above-mentioned thresholds. According to the real time position, information of the speed and the relative distance of the mobile station, the exemplary embodiments further perform the pre-planed RAU control scheme with the look-up table.

The following illustrates each cross mode table corresponding to each cross mode. Each cross mode table describes a pre-planned RAU control scheme of each possible combination. In each cross mode table, the pre-planned RAU control scheme of each possible combination for two mobile stations may be represented by a vector; each element in the vector represents a corresponding attenuation value of the transmission power of each RAU of a plurality of RAUs. According to an exemplary embodiment of the present disclosure, but is not limited to this exemplary embodiment, when an element in the vector is 0, the corresponding RAU of this element may not be attenuated and may transmit with its full power. When an element of the vector is −2T, the corresponding RAU of this element is attenuated by 2TdB. When an element of the vector is x, represents "don't care".

Figure 12:
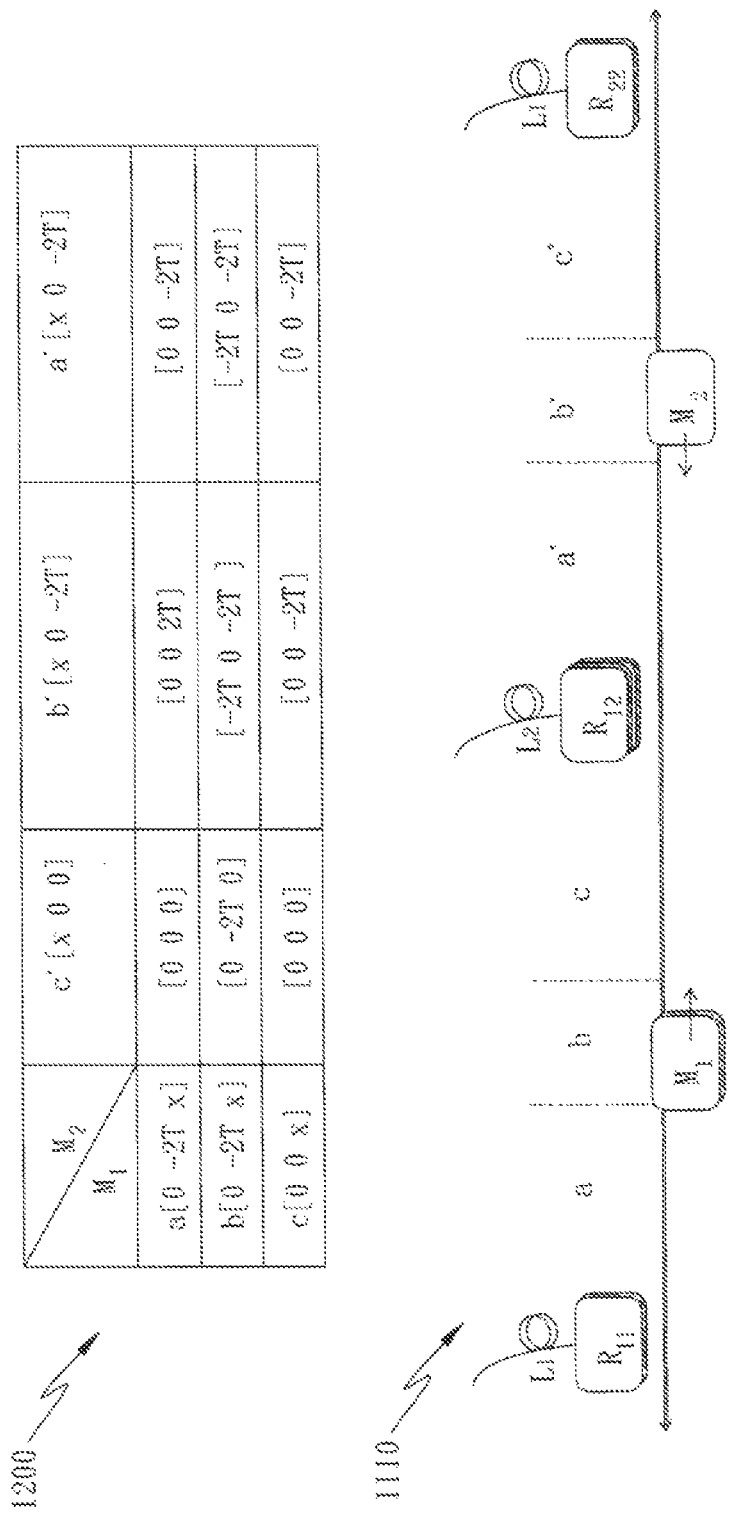
FIG. 12 shows a generated cross mode table for the scenario of $R_{1,2}$ equals to $R_{2,1}$ under the cross mode, according to an exemplary embodiment.

In the scenario of the cross mode 1110 in FIG. 11A (i.e., $R_{1,2}=R_{2,1}$), $R_{1,2}$ and $R_{2,1}$ represent the same RAU. Let the optical fiber length from the base station to the three RAUs (i.e. $R_{1,1}$, $R_{1,2}$, and $R_{2,2}$) are L1, L2, and L3, respectively. According to an exemplary embodiment of the present disclosure, FIG. 12 shows a generated cross mode table 1200 for the scenario of $R_{1,2}$ equals to $R_{2,1}$ under the cross mode Refer to FIG. 12, the RAU control scheme of each possible combination relates to the optical fiber length from the base station to a plurality of RAUs ($R_{1,1}$, $R_{1,2}$, and $R_{2,2}$ in this example). An example of $R_{1,1}$, $R_{1,2}$, and $R_{2,2}$ with fiber lengths L1, L2 and L3, respectively, is described as following.

When L1<L2<L3, the transmission power control scheme of $R_{1,1}$ and $R_{1,2}$ received by the mobile station $M_1$ is the same as the control scheme of the first condition in FIG. 10A; while the transmission power control scheme of $R_{1,2}$ ($R_{1,2}=R_{2,1}$) and $R_{2,2}$ received by the mobile station $M_2$ is the same as the control scheme of the second condition in FIG. 10B; When L1>L2 and L2<L3, the transmission power control scheme of $R_{1,1}$ and $R_{1,2}$ received by the mobile station $M_1$ is the same as the control scheme of the second condition in FIG. 10B; while the transmission power control scheme of $R_{1,2}$ ($R_{1,2}=R_{2,1}$) and $R_{2,2}$ received by the mobile station $M_2$ is the same as the control scheme of the second condition in FIG. 10B. When L1>L2>L3, the transmission power control scheme of $R_{1,1}$ and $R_{1,2}$ received by the mobile station $M_1$ is the same as the control scheme of the second condition in FIG. 10B; while the transmission power control scheme of $R_{1,2}$ ($R_{1,2}=R_{2,1}$) and $R_{2,2}$ received by the mobile station $M_2$ is the same as the control scheme of the first condition in FIG. 10A.

Figure 13A:
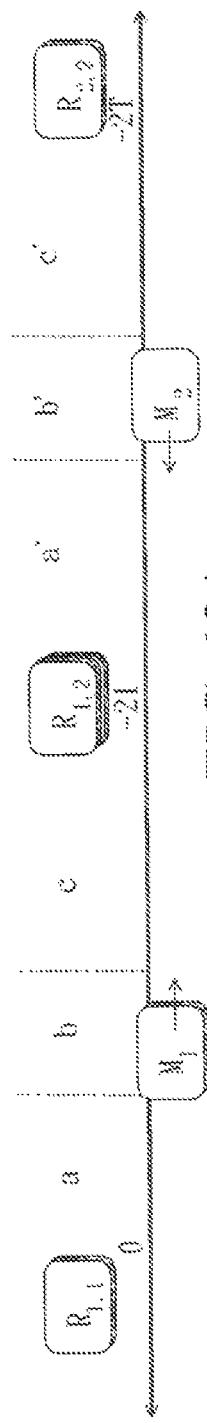
FIG. 13A, FIG. 13B and FIG. 13C show schematic views for the scenarios of the vectors of the combination (2,2) and the combination (2,3) being set to [0 −2T −2T], [0 0 −2T], and [−2T 0 −2T], according to another exemplary embodiment.
Figure 13B:
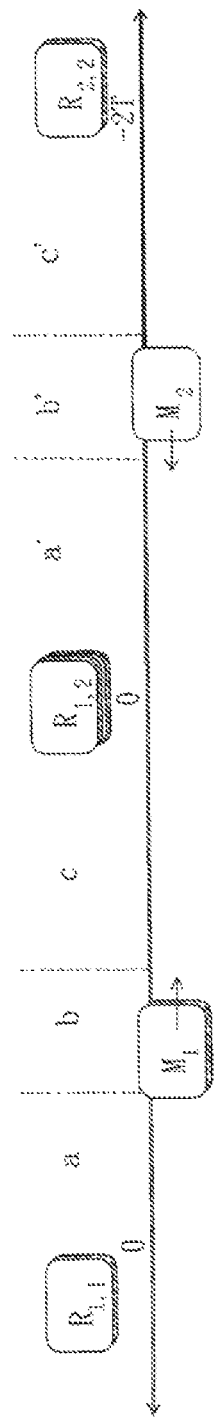
Figure 13C:
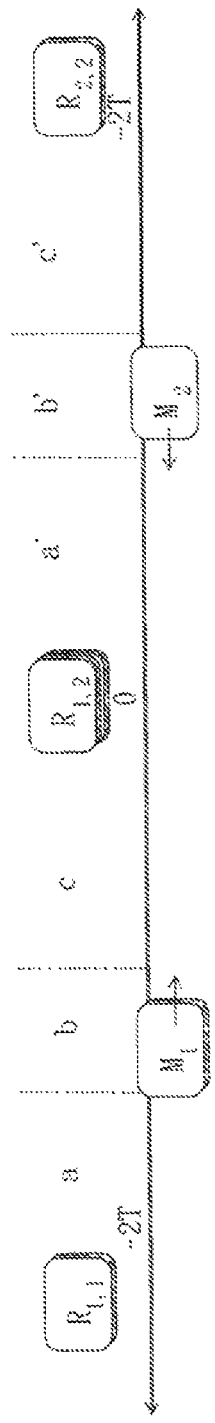

In a cross mode table 1200 in FIG. 12, there are nine vectors of the RAU control scheme representing nine combinations (i, j), i from 1 to 3 and j from 1 to 3, and the control scheme for the vector [0 0 0], the vector [0 0 −2T], and the vector [0 −2T 0] is easily be determined. If the vectors of the combination (2, 2) and the combination (2,3) are set to [0 −2T −2T] or [0 0 −2T], a conflict condition may be occurred. The RAU control scheme for resolving this conflict condition is to set the vector of the combination (2,2) and the combination (2,3) to [−2T 0 −2T]. FIG. 13A and FIG. 13B show the possible conflict conditions when the vectors of the combination (2,2) and the combination (2,3) are set to [0 −2T −2T] and [0 0 −2T]. FIG. 13C shows a schematic view for the vectors of the combination (2,2) and the combination (2,3) are set to [−2T 0 −2T], according to an exemplary embodiment.

As shown in FIG. 13A, when the vector of the combination (2,2) and the combination (2,3) is set to [0 −2T −2T], since the transmission power of $R_{2,1}$ ($R_{1,2}=R_{2,1}$) and $R_{2,2}$ received by the mobile station $M_2$ are both attenuated, the mobile station $M_2$ may be subjected to the condition of the weak signal strength. As shown in FIG. 13B, when the vectors of the combination (2,2) and the combination (2,3) are set to [0 0 −2T], since the mobile station $M_1$ is subject to an interference, the throughput of the mobile station $M_1$ may be decreased. As shown in FIG. 13C, when the vectors of the combination (2,2) and the combination (2,3) are set to [−2T 0 −2T], the RAU (i.e. $R_{1,2}$ or $R_{1,2}$) in between the mobile station $M_1$ located in the zone b and the mobile station $M_2$ located in the zone b' or a' is a main serving RAU and maintains a full transmission power. Therefore, the conflict condition of the mobile station $M_1$ and the mobile station $M_2$ may not occur. The RAU control scheme in FIG. 13C may resolve the aforementioned conflict conditions in FIG. 13A and FIG. 13B.

FIG. 14 shows a generated cross mode table 1400 under the scenario of the cross mode 1120 of $R_{1,1}$ equals to $R_{2,1}$, according to an exemplary embodiment. As shown in FIG. 14, the two RAUs of the mobile station $M_1$ is equivalent to the two RAUs of the mobile station $M_2$. In the cross mode table 1400, the RAU control scheme of each possible combination relates to the optical fiber length (L1 and L2) of $R_{1,1}$ and $R_{1,2}$, respectively. In the cross mode table 1400, the area between $R_{1,1}$ and $R_{1,2}$ may be divided into three zones, i.e. zone a, zone b and zone c. Each of the mobile station $M_1$ and the mobile station $M_2$ may be located in one of these three zones. When L1<L2, the transmission power control scheme of $R_{1,1}$ and $R_{1,2}$ received by the mobile station $M_1$ is the same as the previous described control scheme of the first condition in FIG. 10A; while the transmission power control scheme of $R_{2,1}$ ($R_{2,1}=R_{1,2}$) and $R_{2,2}$ received by the mobile station $M_2$ is the same as the previous described control scheme of the second condition in FIG. 10B; When L1>L2, the transmission power control scheme of $R_{1,1}$ and $R_{1,2}$ received by the mobile station $M_1$ is the same as the previous described control scheme of the second condition in FIG. 10Bb; while the transmission power control scheme of $R_{2,1}$ ($R_{2,1}=R_{1,2}$) and $R_{2,2}$ received by the mobile station $M_2$ is the same as the previous described control scheme of the first condition in FIG. 10A.

Figure 15:
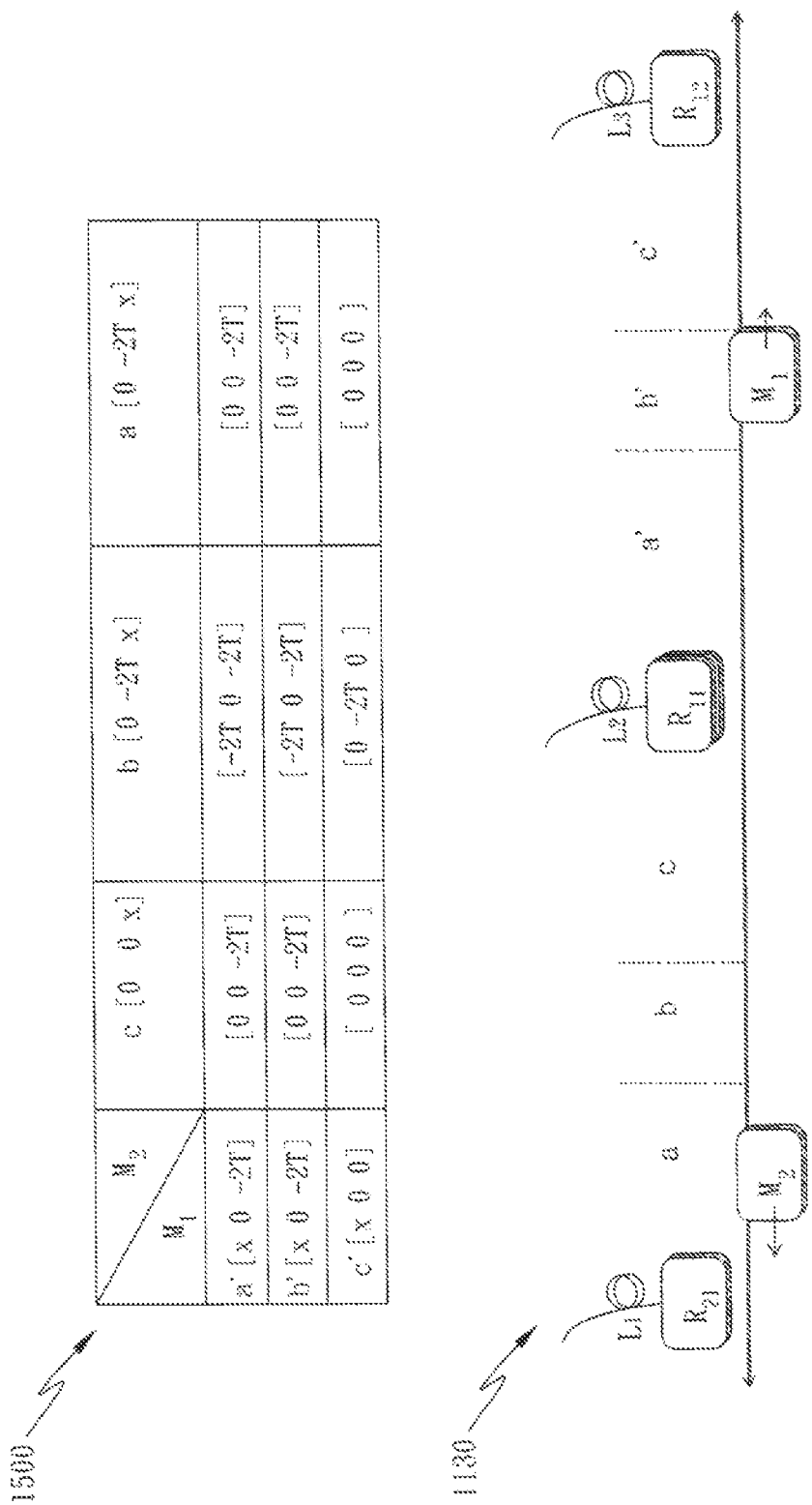
FIG. 15 shows a generated cross mode table under the scenario of the cross mode of $R_{1,1}$ equals to $R_{2,2}$, according to an exemplary embodiment.

FIG. 15 shows a generated cross mode table 1500 under the scenario of the cross mode 1130 of $R_{1,1}$ equals to $R_{2,2}$, according to an exemplary embodiment. Refer to FIG. 15, when L1<L2<L3, the transmission power control scheme of $R_{1,1}$ and $R_{1,2}$ received by the mobile station $M_1$ is the same as the previous described control scheme of the first condition in FIG. 10A; while the transmission power control scheme of $R_{2,1}$ and $R_{2,2}$ ($R_{2,2}=R_{1,1}$) received by the mobile station $M_2$ is the same as the previous described control scheme of the second condition in FIG. 10B; When L1>L2 and L2<L3, the transmission power control scheme of $R_{1,1}$ and $R_{1,2}$ received by the mobile station $M_1$ is the same as the previous described control scheme of the first condition in FIG. 10A; while the transmit power control scheme for $R_{2,1}$ and $R_{2,2}$ ($R_{2,2}=R_{1,1}$) received by the mobile station $M_2$ is the same as the previous described control scheme of the first condition in FIG. 10A. When L1>L2>L3, the transmission power control scheme of $R_{1,1}$ and $R_{1,2}$ received by the mobile station $M_1$ is the same as the previous described control scheme of the second condition in FIG. 10B; while the transmission power control scheme of $R_{2,1}$ and $R_{2,2}$ ($R_{2,2}=R_{1,1}$) received by the mobile station $M_2$ is the same as the previous described control scheme of the first condition in FIG. 10A.

Accordingly, the exemplary embodiments of the present disclosure may pre-determine with an offline manner the relationship of each RAU control scheme and the mobile station's position according to given system parameters, such as the above-mentioned critical thresholds. When in the online operation(s), the exemplary embodiments may perform the pre-planned RAU control scheme and switching between the single mode and the cross mode with the look-up table, according to the real time position, information of the speed and the relative distance (when a plurality of mobile stations appear) of the mobile station.

Figure 16:
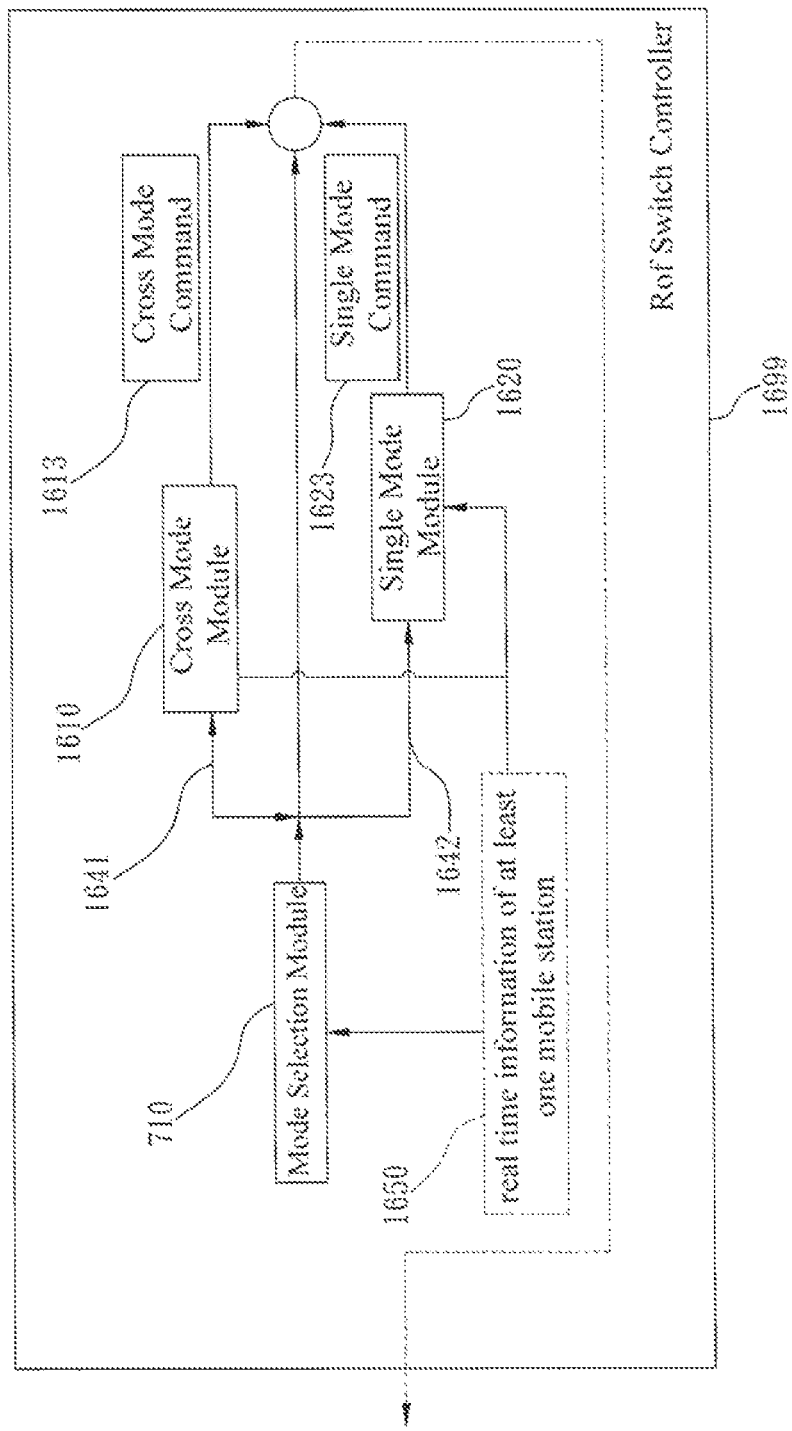
FIG. 16 shows an apparatus for interference suppression in RoF communication systems, according to an exemplary embodiment.

With the above interference suppression method of RoF communication system, FIG. 16 shows an apparatus for interference suppression in RoF communication systems, according to an exemplary embodiment, wherein the apparatus is configured in a RoF switch controller 1699. Refer to FIG. 16, the interference suppression apparatus may comprise a mode selection module 710, a cross mode module 1610, and a single mode module 1620. The mode selection module 710 is configured to continuously update real time information 1650 of at least one mobile station and determine to select a cross mode 1641 or a single mode 1642. When the single mode is selected, the cross mode module issues a single mode command 1623 to the ROF switch controller 1699 when a mobile station approaches a switching point, to control at least one first specific remote antenna unit (RAU). When the cross mode is selected, the cross mode module 1610 determines an immediate cross condition is a new cross condition, then generates a new cross mode table, and when the position of any one mobile station of the at least one mobile station crosses a threshold, issues a cross mode command 1613 to the ROF switch controller 1699 to control at least one second specific RAU according to a corresponding cross mode table.

Figure 17:
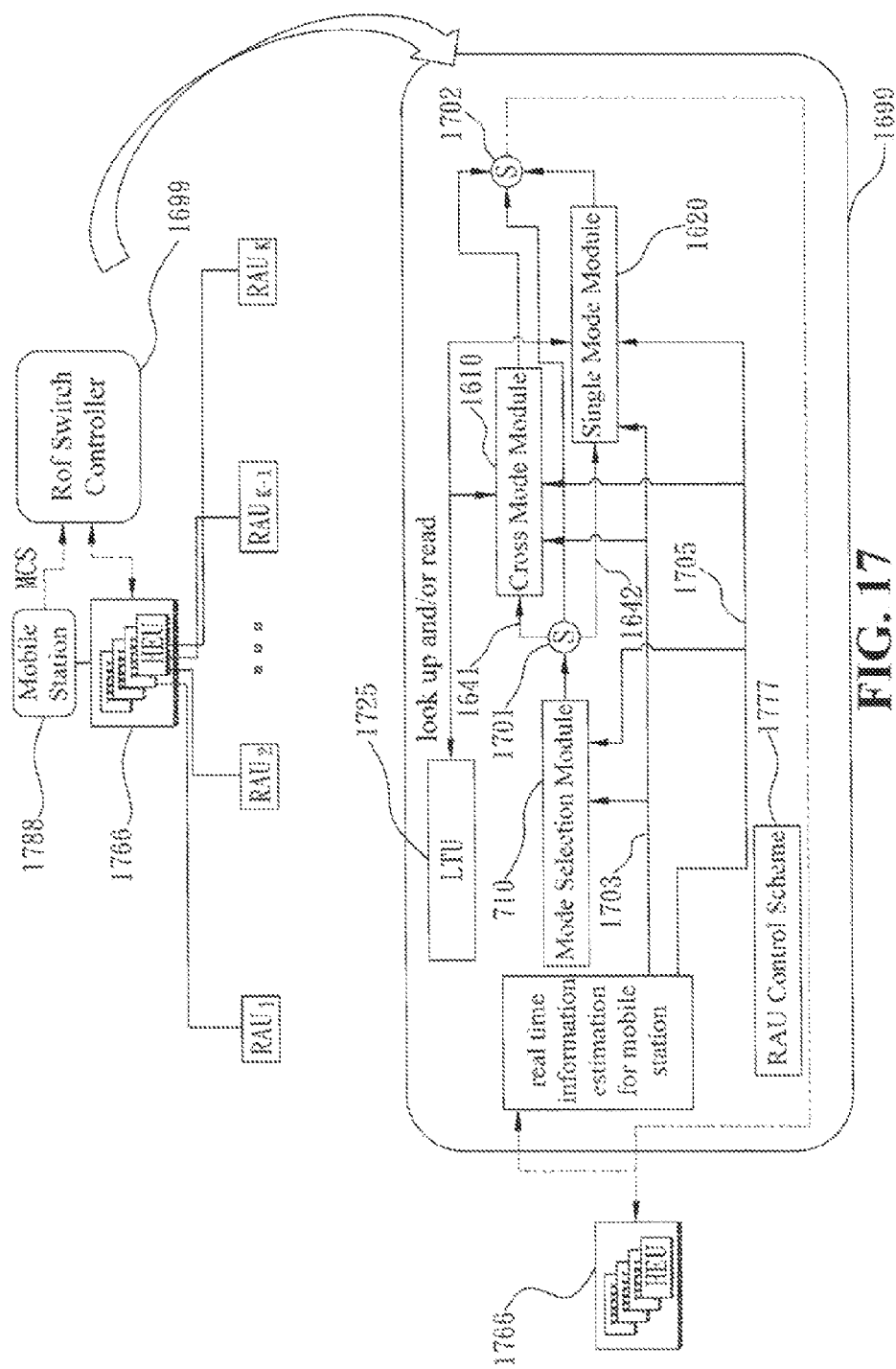
FIG. 17 shows a schematic view for the operation of a RoF switching controller utilizing the interference suppression apparatus in a RoF system, according to an exemplary embodiment.

FIG. 17 shows a schematic view for the operation of a RoF switching controller 1699 utilizing the interference suppression apparatus in a RoF system, according to an exemplary embodiment. Refer to FIG. 17, a mode selection module 710 according to the estimated mobile station real-time information, such as the position of the mobile station (mileage) 1703, moving speed (including direction) 1705, and the nearest two RAUs of each mobile station etc., to input a selected cross mode or single mode to a first switch 1701, and send to the RoF switch controller 1699. When the single mode 1642 is selected, the mode selection module 710 transmits the single mode 1642 to the single mode module 1620 and a second switch 1702, respectively by using the first switch 1701. When the cross mode is selected, the mode selection module 710 transmits the cross mode 1641 to the cross mode module 1610 and the second switch 1702, respectively by using the first switch 1701. The single mode module 1620 reads at least one first specific RAU control scheme in at least one single mode instruction 1623 from a lookup table 1725, and inputs to the second switch 1702 to transmit to the RoF switch controller 1699. The cross mode module 1610 reads at least one second specific RAU control scheme in at least one cross mode command 1613 from a corresponding cross mode table, and inputs to the second switch 1702 to transmit to the RoF switch controller 1699. The RoF switch controller 1699 transmits at least one RAU control scheme 1777 to a head end unit bank (HEU bank) 1766 in a RoF system according to the output of the second switch 1702, to control one or more specific RAUs in the RoF system. In the RoF system, a base station 1788 may transmit or receive signals to/from the mobile station through a plurality of RAUs geographically distributed, such as $RAU_1$ to $RAU_k$. The RoF switch controller 1699 may refer to the static measurement information of a modulation and coding scheme (MCS) provided by the base station 1788 to obtain the aforementioned three thresholds.

The technical features of the RAU control scheme of the single mode, the RAU control scheme of the cross mode, the way for selecting and switching the single mode and the cross mode, the process flow of generating LUT, determining whether multipath interference or not, the definition of the thresholds, the switching point determination, etc. have been described in the aforementioned exemplary embodiments of the present disclosure, and are not repeated here.

In summary, the exemplary embodiments of present disclosure provide a method and apparatus for interference suppression in radio-over-fiber (RoF) communication systems. The technique determines with an offline manner the relationship of each RAU control scheme and the mobile station's position, according to given system parameters. And in the online operations, the technique may perform real time RAU control with the look-up table according to the real time position, the speed and the relative distance (when a plurality of mobile stations appear) information of the mobile station, so that the RoF system(s) may determine whether the multipath mode cause a disconnection, and may automatically adjust the transmission power of the RAU. Therefore, the disclosed exemplary embodiments have characteristics of adjustable, simple implementation and without affecting spectrum efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for interference suppression in radio-over-fiber communication systems, comprising:
   updating a real time information of at least one mobile station and determining to enter a cross mode or a single mode by using a mode selection module;
   in the single mode, when a mobile station of the at least one mobile station approaching a switching point, issuing a single mode command to control at least one first specific remote antenna unit (RAU); and
   in the cross mode, when an immediate cross condition being a new cross condition, generating a new cross mode table, and when a position of any one mobile station of the at least one mobile station crossing a threshold, issuing a cross mode command to control at least one second specific RAU according to a corresponding cross mode table.

2. The method as claimed in claim 1, wherein the single mode command is performed according to a corresponding entry of a plurality of entries generated by a lookup table, and each entry of the lookup table comprises at least one mileage field, a RAU field, and a specific RAU transmit power control scheme for a RAU in the RAU field.

3. The method as claimed in claim 1, wherein the mode selection module determines whether said first mobile station and said second mobile station occur crossing according to a position information of each mobile station of a first mobile station and a second mobile station, an estimated speed, and two nearest RAUs, to determine to enter the cross mode or the single mode.

4. The method as claimed in claim 2, wherein for a mobile station located between a first RAU having a first optical fiber length and a second RAU having a second optical fiber length, when multipath causes at least one interference, entering into the single mode is determined.

5. The method as claimed in claim 4, wherein said method generates in advance a lookup table, and when the first optical fiber length is less than the second optical fiber length, the lookup table includes in advance:

when the mobile station passes through the first RAU, a first mileage of the mobile station, the second RAU, and an information of attenuating a second transmission power of the second RAU; and when the mobile station is at a first switching point, a second mileage of the mobile station, the second RAU, and an information of recovering the second transmission power.

6. The method as claimed in claim 4, wherein said method generates in advance a lookup table, and when the first optical fiber length is greater than or equals to the second optical fiber length, the lookup table includes in advance:

when the mobile station passes through the first RAU, a first mileage of the mobile station, the first RAU, and an information of recovering the first transmission power of the first RAU; and when the mobile station moves to a second switching point, a second mileage of the mobile station, the first RAU, and an information of attenuating the first transmission power of the first RAU.

7. The method as claimed in claim 1, wherein the method, in said single mode, uses a RAU transmission power switching scheme to adjust a first transmission power of a first RAU having a first optical fiber and a second transmission power of a second RAU having a second optical fiber length of a mobile station located between the first RAU and the second RAU.

8. The method as claimed in claim 7, wherein when the first optical fiber length is less than the second optical fiber length, the RAU transmission power switching method includes:

determining a first switching point, and when the mobile station passing through said first RAU, attenuating a second transmission power of the second RAU; and when the mobile station being at the first switching point, recovering the second transmission power of the second RAU.

9. The method as claimed in claim 7, wherein when the first optical fiber length is greater than or equal to the second optical fiber length, the RAU transmission power switching scheme includes:

when the mobile station passing through the first RAU, the first RAU having a first transmission power and the second RAU having a second transmission power; and when the mobile station moves to a second switching point, attenuating the first transmission power.

10. The method as claimed in claim 3, wherein when the two RAUs of the first mobile station and the two RAUs of the second mobile station have one or two RAUs overlapped, the mode selection module determines the first mobile station and the second mobile station occurring crossing, and enters the cross mode.

11. The method as claimed in claim 10, wherein for each cross condition of a plurality of cross conditions, the method generates a corresponding cross mode table to describe at least one control scheme of the first mobile station and the second mobile station, respectively at different intervals for the at least one second specific RAU.

12. The method as claimed in claim 11, wherein the plurality of cross conditions at least includes three cross conditions of $R_{1,2}$ equals to $R_{2,1}$, $R_{1,1}$ equals to $R_{2,1}$ and $R_{1,1}$ equals to $R_{2,2}$, wherein $R_{1,1}$ and $R_{1,2}$ represent nearest two RAUs of the first mobile station, and $R_{2,1}$ and $R_{2,2}$ represent nearest two RAUs of the second mobile station.

13. The method as claimed in claim 12, wherein when a cross condition is $R_{1,2}$ equals to $R_{2,1}$, a main servicing RAU located between the first mobile station and the second mobile station transmits with a full power.

14. The method as claimed in claim 5, wherein the first switching point is determined according to a signal strength threshold of the first RAU received by the mobile station, a negative threshold of a relative transmission power of the first RAU and the second RAU, and a negative threshold of a relative signal transmission delay of the first RAU and the second RAU.

15. The method as claimed in claim 6, wherein the second switching point is determined according to a signal strength threshold of the second RAU received by the mobile station, a positive threshold of a relative transmission power of the first RAU and the second RAU, and a positive threshold of a relative signal transmission delay of the first RAU and the second RAU.

16. An apparatus for interference suppression in radio-over-fiber (RoF) communication systems, configured in a RoF switch controller and comprising:

a mode selection module configured to update a real time information of at least one mobile station and select a cross mode or a single mode;

a single mode module, when the single mode is selected, the single mode module issues a single mode command to the RoF switch controller when a mobile station approaches a switching point, to control at least one first specific remote antenna unit (RAU); and a cross mode module, when the cross mode is selected, the cross mode module determines an immediate cross condition is a new cross condition, then generates a new cross mode table, and when a position of any one mobile station of the at least one mobile station crosses a threshold, issues a cross mode command to the RoF switch controller to control at least one second specific RAU according to a corresponding cross mode table.

17. The apparatus as claimed in claim 16, wherein when the single mode is selected, the mode selection module, by using a first switch, transmits said single mode to said single mode module and a second switch respectively, while when the cross mode is selected, the mode selection module, by using said first switch, transmits the cross mode to the cross mode module and the second switch respectively.

18. The apparatus as claimed in claim 17, wherein the single mode module reads at least one first specific RAU control scheme in at least one single mode command from a lookup table, and inputs the at least one first specific RAU control scheme to the second switch for transmitting to the RoF switch controller.

19. The apparatus as claimed in claim 17, wherein the cross mode module reads at least one second specific RAU control scheme in at least one cross mode command from the corresponding cross mode table, and inputs the at least one second specific RAU control scheme to the second switch for transmitting to the RoF switch controller.

20. The apparatus as claimed in claim 16, wherein the RoF switch controller transmits at least one RAU control scheme to a RoF system according to an output of a second switch, to control one or more specific RAUs in the RoF system.

21. The apparatus as claimed in claim 18, wherein each entry of a plurality of entries in the lookup table includes at least a mileage field, a RAU field, and a control scheme of a specific RAU transmission power for a RAU in the RAU field.

22. The apparatus as claimed in claim 16, wherein the mode selection module determines whether a first mobile station and a second mobile station occurring crossing according to a position information, an estimated speed, and nearest two RAUs of each mobile station of the first and the second mobile stations, to select the cross mode or the single mode.

* * * * *